(12) United States Patent
Anderson et al.

(10) Patent No.: US 9,076,282 B2
(45) Date of Patent: Jul. 7, 2015

(54) GAME DEVICE WITH FEATURE FOR EXTENDING LIFE OF VARIABLE DISPLAYS IN CONFIGURABLE GAME BUTTONS

(75) Inventors: Peter R. Anderson, Glenview, IL (US); Mark B. Gagner, West Chicago, IL (US); Larry J. Pacey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1756 days.

(21) Appl. No.: 12/299,772

(22) PCT Filed: Jun. 15, 2007

(86) PCT No.: PCT/US2007/014146
§ 371 (c)(1),
(2), (4) Date: Nov. 5, 2008

(87) PCT Pub. No.: WO2007/146435
PCT Pub. Date: Dec. 21, 2007

(65) Prior Publication Data
US 2009/0098938 A1    Apr. 16, 2009

Related U.S. Application Data

(60) Provisional application No. 60/813,809, filed on Jun. 15, 2006, provisional application No. 60/898,482, filed on Jan. 31, 2007.

(51) Int. Cl.
*A63F 13/22*   (2014.01)
*G07F 17/32*   (2006.01)
*A63F 13/00*   (2014.01)

(52) U.S. Cl.
CPC ............ *G07F 17/32* (2013.01); *G07F 17/3211* (2013.01); *A63F 13/00* (2013.01); *G07F 17/3209* (2013.01)

(58) Field of Classification Search
CPC ....... A63F 13/00; A63F 9/24; A63F 2300/00; G07F 17/3209; G07F 17/3211
USPC ........... 463/16, 17, 20, 22, 25, 30–34, 37, 43; 345/156; 273/138.2; 715/867; 341/23, 341/176; 700/22
See application file for complete search history.

(56) References Cited

U.S. PATENT DOCUMENTS 5,850,220 A * 12/1998 Motai ............................ 715/867
6,067,074 A    5/2000 Lueders ........................ 345/156

(Continued)

FOREIGN PATENT DOCUMENTS

WO    WO 2006/116771 A2    11/2006    .............. G06F 19/00
WO    WO 2007/032949 A1     3/2007    .............. G07F 17/32

(Continued)

OTHER PUBLICATIONS

Screensaver (No Date), Wikiepdia.org.*

(Continued)

*Primary Examiner* — Damon Pierce
(74) *Attorney, Agent, or Firm* — Nixon Peabody LLP (57) ABSTRACT

A user-input button for a gaming device includes a movable member, a variable display, and a controller. The movable member activates a function associated with the user-input button. The variable display is proximate the movable member and displays an image associated with the function of the user-input button. The variable display includes a plurality of pixels for displaying the image. The controller is coupled to the variable display and is programmed to decrease the optical output of at least some of the pixels when the gaming device is in a static state.

26 Claims, 9 Drawing Sheets

(56) References Cited

U.S. PATENT DOCUMENTS

| | | | |
|---|---|---|---|
| 6,102,394 A | 8/2000 | Wurz et al. | 273/138.2 |
| 6,117,010 A | 9/2000 | Canterbury et al. | 463/20 |
| 6,454,649 B1 | 9/2002 | Mattice et al. | 463/17 |
| 6,798,359 B1 | 9/2004 | Invancic | 341/23 |
| 6,801,811 B2 | 10/2004 | Ranganathan et al. | 700/22 |
| 7,250,898 B2 | 7/2007 | Higginson | 341/176 |
| 7,294,059 B2* | 11/2007 | Silva et al. | 463/37 |
| 7,331,868 B2* | 2/2008 | Beaulieu et al. | 463/30 |
| 7,780,527 B2* | 8/2010 | Gauselmann | 463/30 |
| 7,789,756 B2* | 9/2010 | Jones et al. | 463/37 |
| 7,868,857 B2* | 1/2011 | Nathan et al. | 345/82 |
| 2001/0035874 A1* | 11/2001 | Hamilton et al. | 345/867 |
| 2002/0173354 A1 | 11/2002 | Winans et al. | 463/20 |
| 2003/0216167 A1 | 11/2003 | Gauselmann | 463/25 |
| 2003/0216173 A1 | 11/2003 | Gauselmann | 463/30 |
| 2003/0216174 A1 | 11/2003 | Gauselmann | 463/30 |
| 2004/0038721 A1 | 2/2004 | Wells | 463/16 |
| 2004/0142737 A1 | 7/2004 | Gauselmann | 463/16 |
| 2005/0059458 A1 | 3/2005 | Griswold et al. | 463/16 |
| 2005/0060669 A1* | 3/2005 | Lowles | 715/867 |
| 2005/0113163 A1 | 5/2005 | Mattice et al. | 463/16 |
| 2005/0204313 A1* | 9/2005 | Enoki et al. | 715/867 |
| 2005/0246657 A1* | 11/2005 | Widner | 715/867 |
| 2006/0015827 A1* | 1/2006 | Ferguson et al. | 715/867 |
| 2006/0166728 A1 | 7/2006 | Cornell et al. | 463/16 |
| 2006/0178205 A1 | 8/2006 | Bleich et al. | 463/22 |

FOREIGN PATENT DOCUMENTS

| | | | |
|---|---|---|---|
| WO | WO 2008/024348 A2 | 2/2008 | A63F 13/10 |
| WO | WO 2008/027447 A2 | 3/2008 | A63F 13/06 |
| WO | WO 2008/057191 A2 | 5/2008 | |

OTHER PUBLICATIONS

Philips LCD Monitor Electronic User's Manual: 230W5 (2004), Koninklijke Philiips Electronics NV.*

Amazon.com: Hoyle 3D Casino: Windows: Video Games (No Date), Amazon.com.*

Richards, Geoff, World's first keyboard with LCD keys (Sep. 19, 2005), bit-tech.net url:<http://www.bit-tech.net/news/modding/2005/09/19/lcd_keyboard/1>.*

PCT International Search Report for International Application No. PCT/US2007/014146 mailed on Aug. 8, 2008 (2 pages).

PCT International Written Opinion for International Application No. PCT/US2007/014146 mailed on Aug. 8, 2008 (3 pages).

* cited by examiner

GAME DEVICE WITH FEATURE FOR EXTENDING LIFE OF VARIABLE DISPLAYS IN CONFIGURABLE GAME BUTTONS

CROSS REFERENCE TO RELATED APPLICATIONS

This application is a U.S. national stage of International Application No. PCT/US2007/014146, filed Jun. 15, 2007, which is related to and claims priority to U.S. Provisional Application No. 60/898,482, filed Jan. 31, 2007, and U.S. Provisional Application No. 60/813,809, filed Jun. 15, 2006, each of which is incorporated herein its entirety.

FIELD OF THE INVENTION

The present invention relates generally to gaming machines, and methods for playing wagering games, and more particularly, to a gaming system having a feature that extends the life of and/or reduces the effect of long-term static imaging in variable displays.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Some gaming machines include an input device (e.g., a push-button) that has an associated input-device display. An exemplary display used as an input-device display is an organic light emitting diode (OLED). One problem associated with current input-device displays is that they exhibit a burn-in effect (e.g., a gradual degradation of illuminated pixels) when a particular image is displayed for an extended period of time. Similarly, another problem associated with current input-device displays is that they tend to have a reduced life because the particular image is continuously displayed over extended periods of time.

Thus, a need exists for an improved apparatus and method related to reduced burn-in effect and/or extended life of input-device displays. The present invention is directed to satisfying one or more of these needs and solving other problems.

SUMMARY OF THE INVENTION

According to one aspect of the present invention, a user-input button for a gaming device includes a movable member, a variable display, and a controller. The movable member activates a function associated with the user-input button. The variable display is proximate the movable member and displays an image associated with the function of the user-input button. The variable display includes a plurality of pixels for displaying the image. The controller is coupled to the variable display and is programmed to decrease the optical output of at least some of the pixels when the gaming device is in a static state.

According to another aspect of the invention, a method of using a user-input button for a gaming device includes activating a function associated with the user-input button in response to movement of a movable member associated with the user-input button. The method further includes displaying information associated with the function of the user-input button via a plurality of pixels of a variable display. Optical output of at least some of the pixels is decreased when the gaming device is in a static state.

According to yet another aspect of the invention, a method is directed to conducting a wagering game on a gaming device having a plurality of user-input buttons. The method includes actuating one of the plurality of user-input buttons to activate a respective function of the gaming device. The method further includes displaying an image on a variable display associated with each of the plurality of user-input buttons, wherein the image is displayed via a plurality of pixels of the variable display. In response to the gaming device being in a static state, illumination of the variable display associated with at least one of the user-input buttons is discontinued while illuminating the variable display of at least another one of the user-input buttons.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5a is an exploded isometric view of a configurable mechanical button panel according to another embodiment of the present invention.

FIG. 5b is a side view of a mechanical button used in the configurable mechanical button panel of FIG. 5a.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1A:
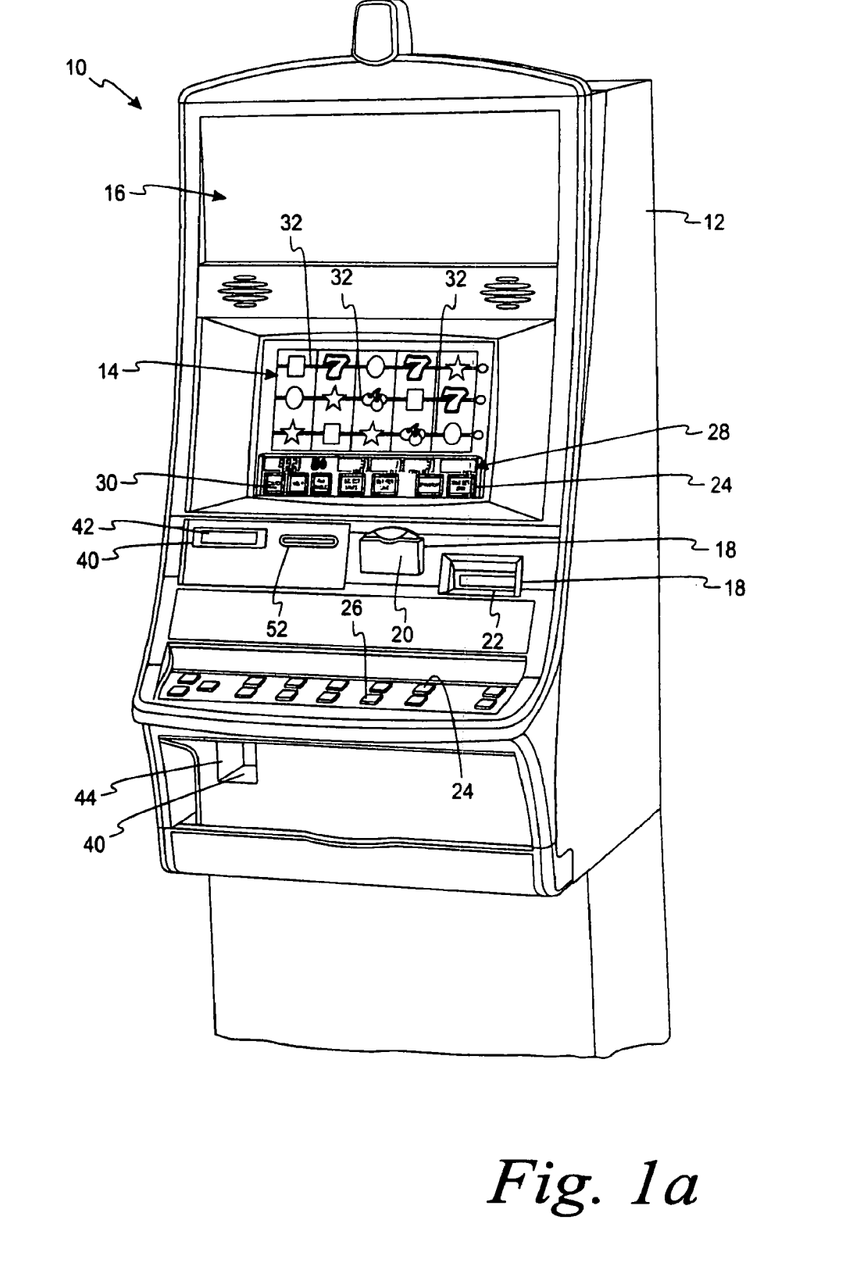
FIG. 1a is a perspective view of a free standing gaming machine embodying the present invention.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
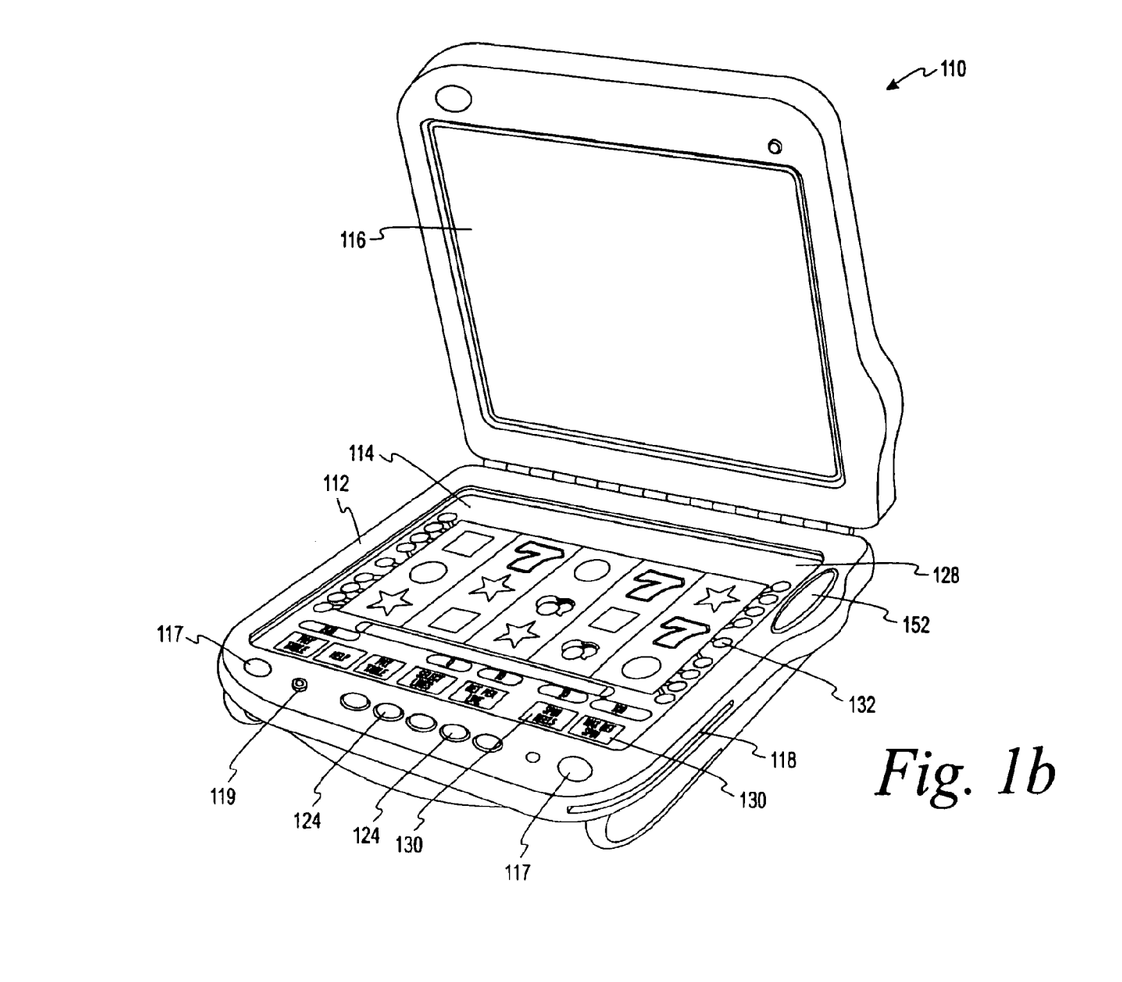
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1b, comprises a biometric sensing device.

Figure 2:
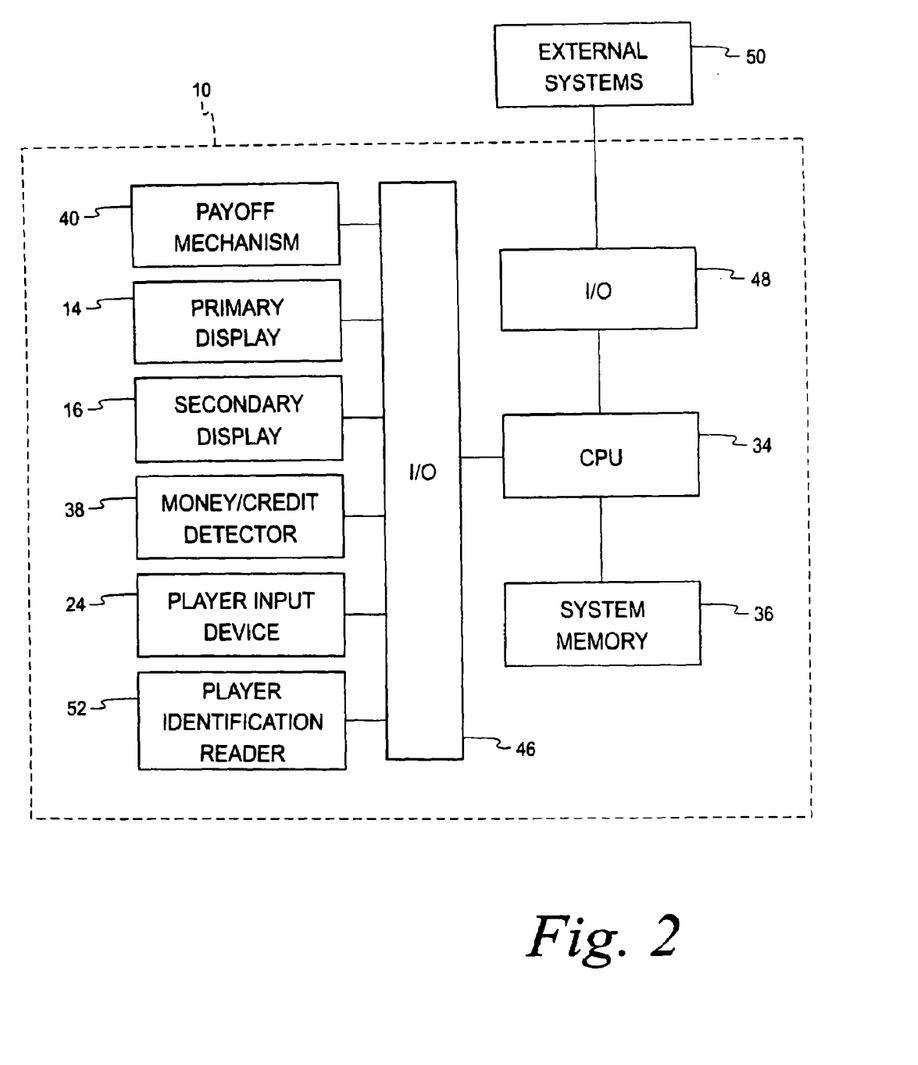
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1a, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween.

As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
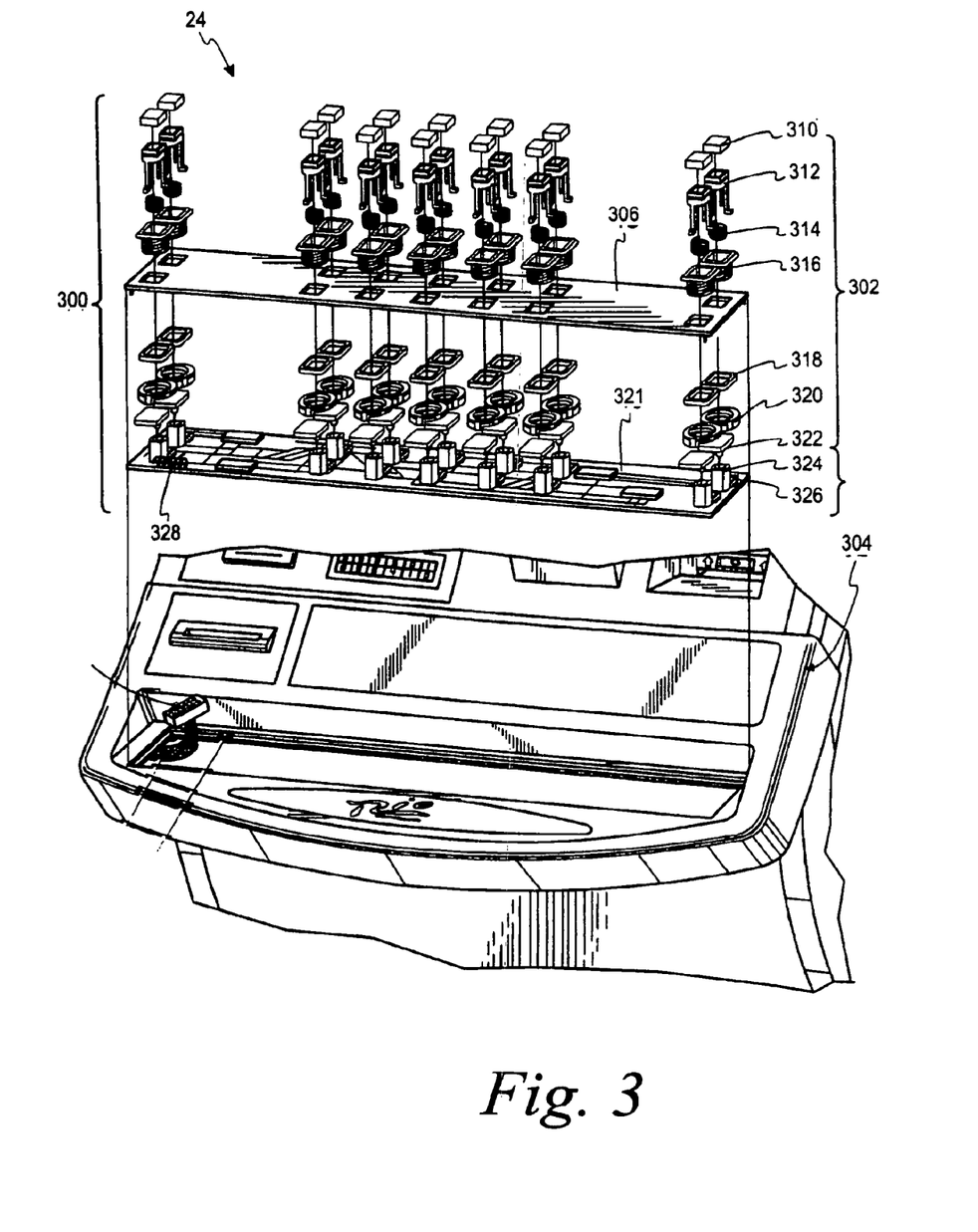
FIG. 3 is an exploded isometric view of a button panel system according to one embodiment of the present invention.

Turning now to FIG. 3, a button panel system 300 includes a button panel assembly 302 and a printed circuit board assembly 304. The button panel assembly 302 includes a button panel 306 and actuator assemblies 310, 312, 314, 316, 316, 318, 320 (hereinafter referred to as "310-320") while the printed circuit board assembly 304 includes a printed circuit board 321, switch assemblies 322, 324, 326 (hereinafter referred to as "322-326") and an electrical connector 328. Fourteen actuator assemblies 310-320 and fourteen corresponding switch assemblies 322-326 are depicted in FIG. 3.

Figure 4:
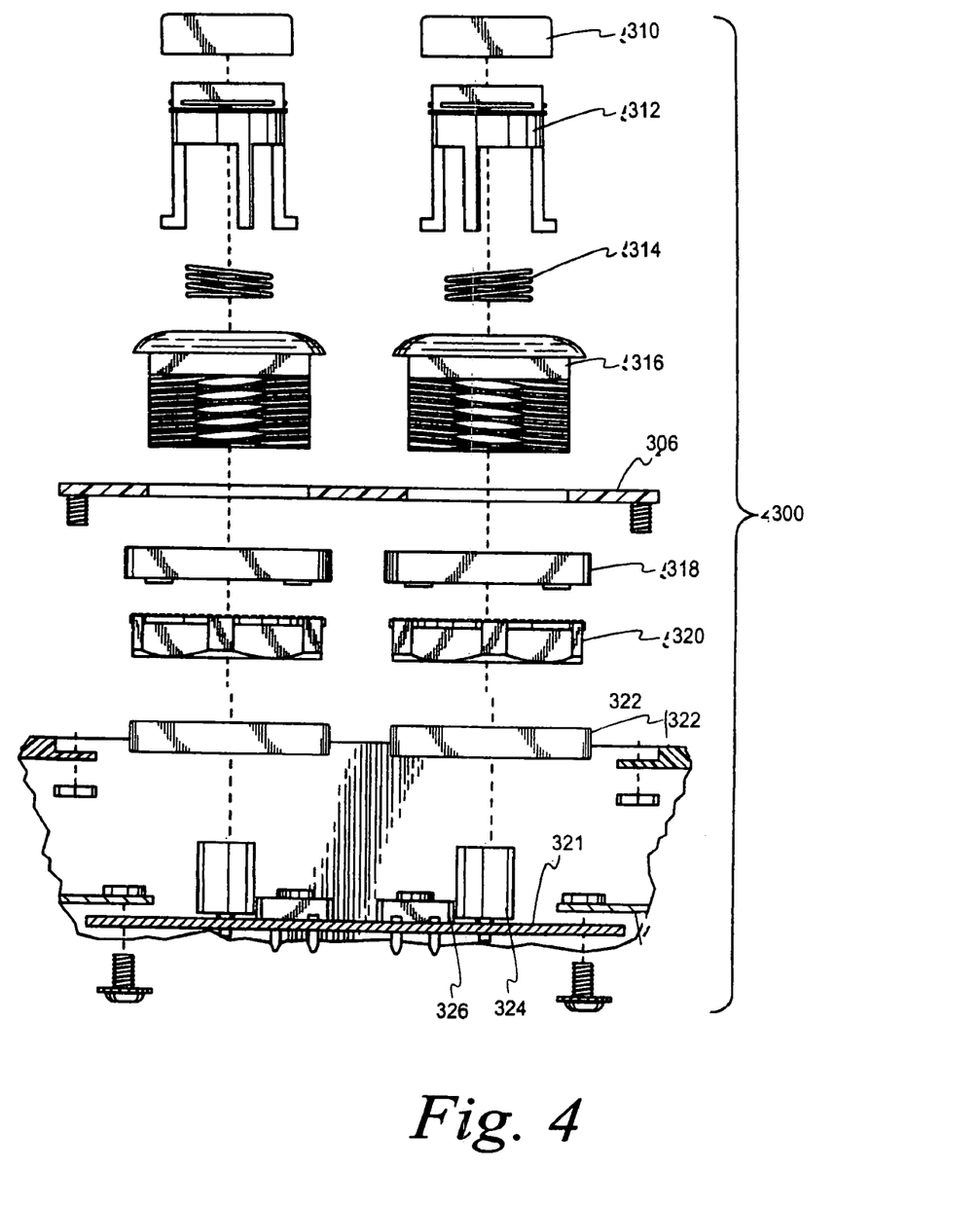
FIG. 4 is an enlarged exploded side view of the button panel system of FIG. 3.

Referring to FIG. 4, which shows an enlarged exploded side view of the button panel system 300, the actuator assemblies 310-320 are assembled on the button panel 306. The switch assemblies 322-326 and the electrical connector 328 (shown in FIG. 3) are assembled on the printed circuit board 321.

Referring to FIGS. 3 and 4, each actuator assembly includes a lens 310, an actuator 312, a compression spring 314, a bezel 316, an optional plastic spacer 318, and a plastic nut 320. When the button panel assembly 302 is in an assembled form, the compression spring 314 is contained within the bezel 316 between a lower shelf formed by the bezel 316 and an upper square portion of the actuator 312. In the illustrated embodiment, the actuator 312 includes the upper square portion and three arms extending downward from the upper square portion. It is contemplated, however, that the actuator 312 may have various other forms, so long as the actuator 312 is capable of actuating the switch 326.

When the button panel assembly 302 is in its assembled form, the lens 310 is secured to the upper square portion of the actuator 312 and extends upward above the bezel 316. The lens 310 contains a printed label describing the function of the associated button and is the portion of the button pressed by a player to cause the gaming device to perform that function. The lens 310 also serves to diffuse light emitted by a light source 322, which is one of the components of the switch assembly 322-326 connected to the printed circuit board 321. The light source 322 can be a lamp, a light-emitting diode display such as an organic light-emitting diode ("OLED") display, a multi-color display, or other suitable source of light display. An OLED display includes, in general, numerous independently lit organic light-emitting diodes ("OLEDs"), which are also referred to as pixels of the display. The OLEDs can be independently controlled. For example each one of the OLEDs can be lit or unlit independent of each other, or can be programmed to output a specific level of optical intensity that is selected from a plurality of optical intensity levels.

The bezel 316 is inserted into a corresponding aperture formed by the button panel 306 and is secured to the button panel 306 by the nut 320, which is threadably engaged to a threaded outer surface of the bezel 316 below the spacer 318. The spacer 318 may located immediately beneath the button panel 306 as shown, or may alternatively be located immediately above the button panel 306 to raise the button further above the button panel 306. To retain the actuator within the actuator assembly 310-320 and thereby prevent removal thereof, the lowermost ends of the respective arms of the actuator 312 are turned outward such that these ends abut a lowermost surface of the bezel 316 when the lens 310 has not been pressed.

Each switch assembly 322-326 includes the light source 322, a socket 324, and a switch 326. Because the socket 324 and the switch 326 are soldered to the printed circuit board 321, these components are depicted in the drawings as already being attached to the printed circuit board 321. When the printed circuit board assembly 304 is assembled, the light source 322 is secured within the socket 324 which, in turn, is secured to the printed circuit board 321. The socket 324 extends upward from the printed circuit board 321 and between the arms of the actuator 312. The upper square portion of the actuator 312 forms an aperture to allow light from the light source 322 within the socket 324 to pass therethrough and illuminate the lens 310. The switch 326 is secured to the printed circuit board 321 at a location adjacent to the socket 324 and beneath one of the arms of the actuator 312. Although the switch 326 is illustrated as a "pancake-type" mechanical switch, it is contemplated that the switch 326 may take various other forms such as a proximity switch or an optical switch.

Figures 5A, 5B:
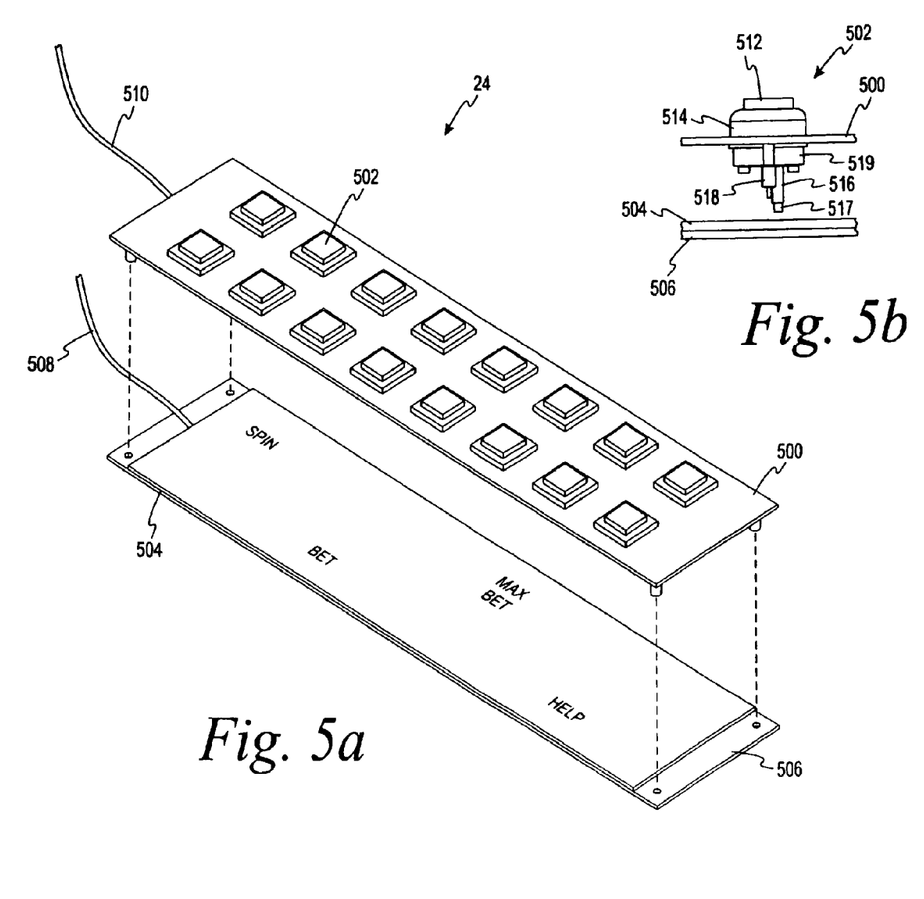

Turning now to FIG. 5a, according to an alternative embodiment of the present invention the player input device 24 includes a button panel 500, a plurality of mechanical buttons 502, a light-source panel 504 (e.g., an OLED panel), a support panel 506, a control cable 508, and a lighting cable 510. The button panel 500 contains multiple mechanical buttons 502 and is electrically connected to a power supply and controller via the lighting cable 510. The lighting cable 510 provides power to optional lighting elements that are used to illuminate the buttons 502 in addition to the light-source panel 504. In some cases, the lighting cable 510 also provides signaling from the primary controller to a secondary controller on or in close proximity to the button panel 500, wherein the secondary controller controls lighting effects on the button panel 500.

The button panel 500 is connected to the support panel 506, which is also used to position the light-source panel 504. The light-source panel 504 receives power and receives and sends signals via the control cable 508. The light-source panel 504 is positioned between the button panel 500 and the support panel 506, and can be configured as a single switch with a single associated button 502 to accommodate a single function. The light-source panel 504 can also be configured to have multiple switches (e.g., as illustrated in FIG. 5a: "SPIN," "BET," "MAX BET," and "HELP") via the plurality of buttons 502 to accommodate multiple functions.

The location of the switches on the light-source panel 504 is configurable, and may be done prior to the start of play or dynamically during play. Multiple switches can be configured on the light source 504 and an equal number of buttons 502 can be arranged to correspond with each location or switch. Once assembled, the button panel 500 is parallel to the light source 504.

Referring to FIG. 5*b*, a side view of a button 502 on the button panel 500 is shown. Indicia presented on a button cap 512 provides the player with information about the purpose and function of the button 502. The indicia presented on or through the button cap 512 can have any form (e.g., insert, liquid crystal display (LCD), OLED, multi-color display, etc.), or be formed through various means (e.g., etching, screening, etc.). The button cap 512 is inserted into a bezel 514 that is connected to the button panel 500 and a button body 519.

The buttons 502 can be backlit using various lighting methods. For example, the buttons 502 include lighting elements such as a lamp 518 that is placed within the button body 519. The lamp 518 can be an OLED display or any other suitable source of light display. An actuator 516 is connected to the button cap 512 through the button body 519. The tip of the actuator 516 is a stylus nib 517 that is made, for example, from a soft material such as rubber or nylon. The stylus nib 517 is the component of the mechanical button 502 that contacts the surface of light source 504. To initiate a function, the player presses the button cap 512 on button 502. As the button cap 512 moves away from the player, or downward, the actuator 516 and the stylus nib 517 move down and contact the light source 504. The distance required for the actuator 516 to travel to reach the light source 504 can be any distance deemed necessary to cause the contact and to achieve the result of altering the voltage or electrical signal at the point of contact on the light source 504 by the stylus nib 507.

Additional aspects of the button 502 may include an internal mechanical device producing a "clicking" sound or tactile sensation. One advantage of the buttons 502 is that it allows a relatively quick reconfiguration of the buttons 502 to meet requirements of a new game offering or a specific casino request. If, for example, the mechanical buttons 502 are configured with an LCD for displaying indicia and the mechanical buttons 502 received signaling through the lighting cable 510, a new game offering could automatically reconfigure the button panel 500 including the indicia presented on the mechanical buttons 502. As the new game is loaded, signals are sent to the button panel 500 to configure the buttons 502. Specific positions on the light source 504 would correspond to the intended use of the buttons 502. After the new game is loaded, the new functions of the new game are initiated by signals that are received from specific positions on the light source 504.

To extend the life of a button display and reduce burn-in effects (i.e., a gradual degradation of illuminated pixels over time) various techniques can be used when using displays that have independently illuminated lights (or pixels), such as OLED displays. One technique provides dim or blank buttons when the machine on which the buttons are installed is not being used. For example, if the buttons are used in a gaming machine the buttons are dim or blank when the gaming machine is in a static state. The drawings described below provide a few examples of some of the techniques used to extend the life of a button display.

Figure 6A:
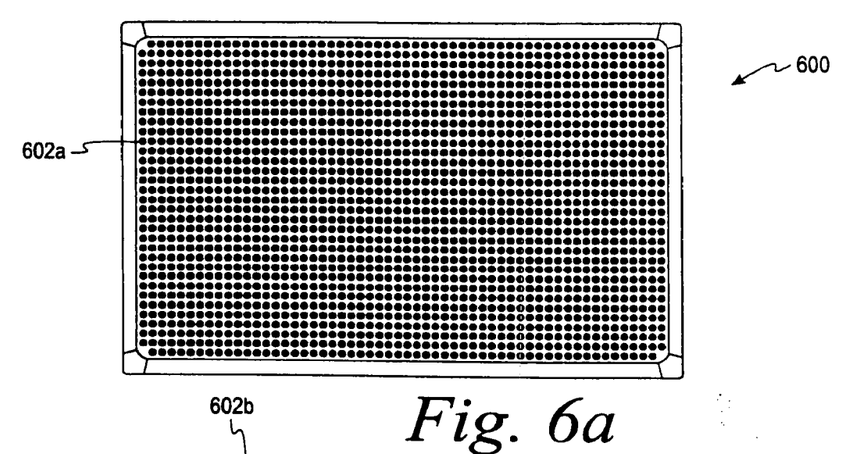
FIG. 6a is a schematic representation of an illuminated button having a plurality of light sources that are shown in a lit state, according to an alternative embodiment of the present invention.
Figure 6B:
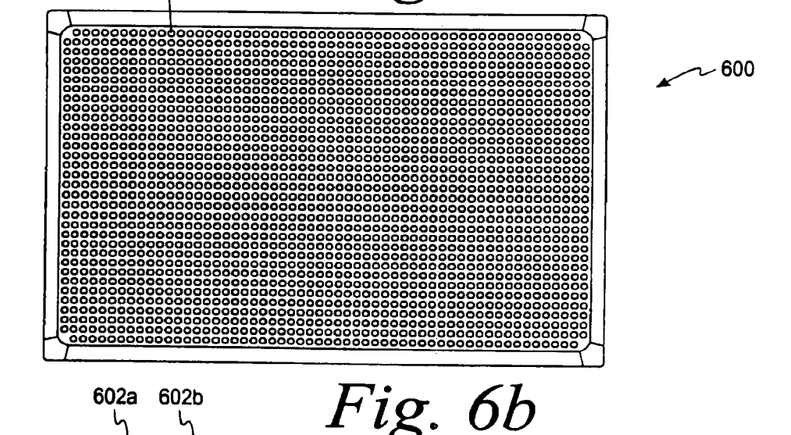
FIG. 6b shows the illuminated button of FIG. 6a having the light sources in an unlit state.
Figure 6C:
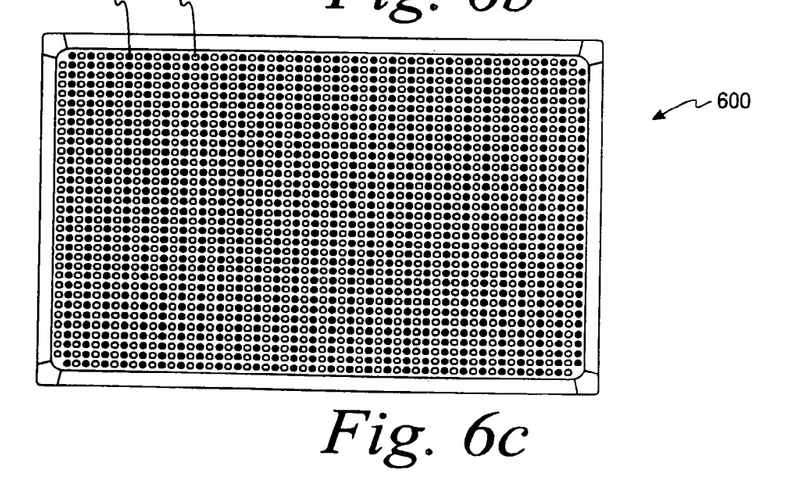
FIG. 6c shows the illuminated button of FIG. 6a having only about half of the light sources in a lit state.

Referring to FIGS. 6*a*-6*c*, a top view representation of an illuminated button 600 shows numerous pixels 602 of an OLED-type display. The illuminated button 600 can be used in any button on the button panel of the player input device 24 described above in reference to FIGs. 1-5*b*. Although other types of displays may be used, the examples provided below will refer specifically to OLED-type displays.

The illuminated button 600 is illustrated in FIG. 6*a* in a "lit" state, wherein the pixels 602*a* of the OLED display are all lit. In FIG. 6*b*, the button 600 is illustrated in an "off" state, wherein the pixels 602*b* of the OLED display are all off (or non-illuminated). In addition to being able to switch the optical output of the pixels between the "lit" state and the "off" state, the level of optical output to the pixels can be increased or decreased to a desired level that is selected from a plurality of optical output levels.

In FIG. 6*c*, the button 600 is illustrated in a "dim" state, wherein approximately half of the pixels 602*a* are lit and approximately half of the pixels 602*b* are off. Any number of the pixels can be selected to be lit or off, as long as some pixels are lit and some pixels are off. Alternatively, all the pixels 602 can be programmed to illuminate at a lower level than their maximum range of optical output (e.g., at half their maximum range of optical output) to provide the "dim" state.

Optionally, the lit pixels 602*a* can remain lit for a predetermined period of time after which the lit pixels 602*a* are turned off. When the lit pixels 602*a* are turned off, the off pixels 602*b* are lit. By alternating a number of pixels between the "lit" state and the "off" state the overall life of the display of the illuminated button 600 is extended.

Figure 7A:
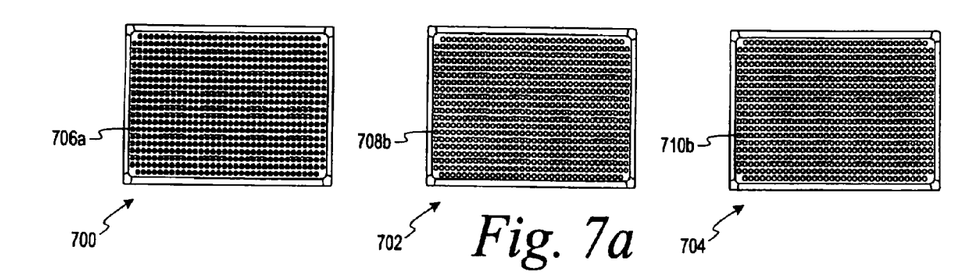
FIG. 7a is a schematic representation of a plurality of illuminated buttons in which only a first button is in a lit state during a first time period, according to an alternative embodiment of the present invention.
Figure 7B:
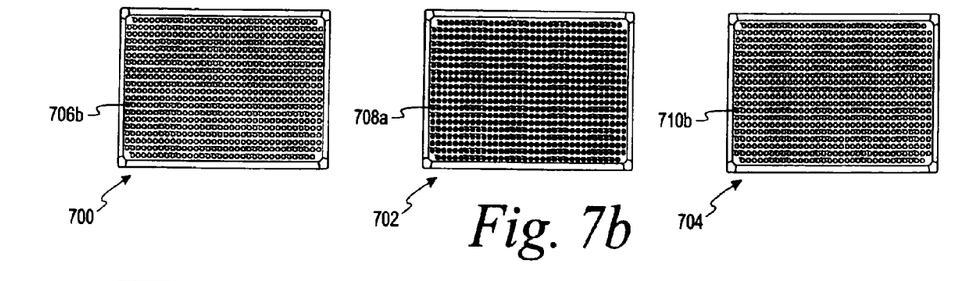
FIG. 7b shows the illuminated buttons of FIG. 7a during a second time period in which only a second button is in the lit state.
Figure 7C:
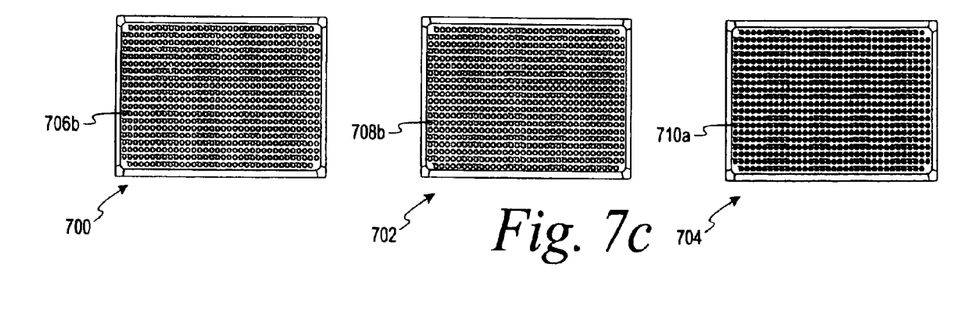
FIG. 7c shows the illuminated buttons of FIG. 7a during a third time period in which only a third button is in the lit state.

Referring to FIGS. 7*a*-7*c*, a top view representation shows a first illuminated button 700, a second illuminated button 702, and a third illuminated button 704 (collectively referred to as "illuminated buttons 700-704"). Similar to the illuminated button 600, the illuminated buttons 700-704 can be used in any button on the button panel of the player input device 24 described above in reference to FIGS. 1-5*b*. Each of the illuminated buttons 700-704 includes numerous pixels that alternate between a "lit" state and an "off" state. To extend the life of the illuminated displays, another exemplary technique cycles through the illuminated buttons 700-704 when the machine on which the illuminated buttons 700-704 are installed is in a static state. A full cycle of alternating buttons is described in more detail below,.

In FIG. 7*a*, during a first time period, the first illuminated button 700 is shown in the "lit" state, wherein its pixels 702*a* are all lit. The second and third illuminated buttons 702, 704 are shown in the "off" state, wherein their respective pixels 708*b*, 710*b* are all off. In FIG. 7*b*, during a second time period, the first and third illuminated buttons 700, 704 are shown in the "off" state, wherein their respective pixels 706*b*, 710*b* are all off. The second illuminated button 702 is shown in the "lit" state, wherein its pixels 708*a* are all lit. In FIG. 7*c*, during a third time period, the first and second illuminated buttons 700, 702 are shown in the "off" state, wherein their respective pixels 706*b*, 708*b* are all off, and the third illuminated button 704 is shown in the "lit" state, wherein its pixels 710*a* are all lit. Accordingly, the illuminated buttons 700-704 alternate between the "lit" state and the "off" state as each button is cycled through for a predetermined period of time.

Alternatively, other cycling and lighting patterns can be used. For example, instead of having a single button of the illuminated buttons 700-704 in the "lit" state during a particular time period, two buttons of the illuminated buttons 700-704 can be in the "lit" state during the same time period. Optionally, the time periods during which the illuminated buttons 700-704 remain in either the "lit" state or the "off" state can be randomly selected, can vary from one cycle to a subsequent cycle, and can be different for each button. For example, during a first cycle, the first illuminated button 700 can be programmed to remain in the "off" state for one minute, the second illuminated button 702 can be programmed to remain in the "off" state for thirty seconds, and the third illuminated button 704 can be programmed to remain in the "off" state for a randomly selected period of time (which can be selected from, e.g., one second to ten minutes). In a second cycle, the first illuminated button 700 can be programmed to remain in the "off" state for two minutes, the second illuminated button 702 can be programmed to remain in the "off" state for one minute, and the third illuminated button 704 can be programmed to remain in the "off" state for fifteen seconds. The alternation between the "lit" and "off" states of the illuminated buttons 700-704 can result in overlapping the states of the buttons, wherein all the buttons may be in the same state for a particular period of time. According to other alternative embodiments, the number of pixels that alternate between the "lit" state and the "off" state (for each of the illuminated buttons 700-704) can vary in accordance with the technique described above in reference to FIGS. 6a-6c.

Figure 8A:
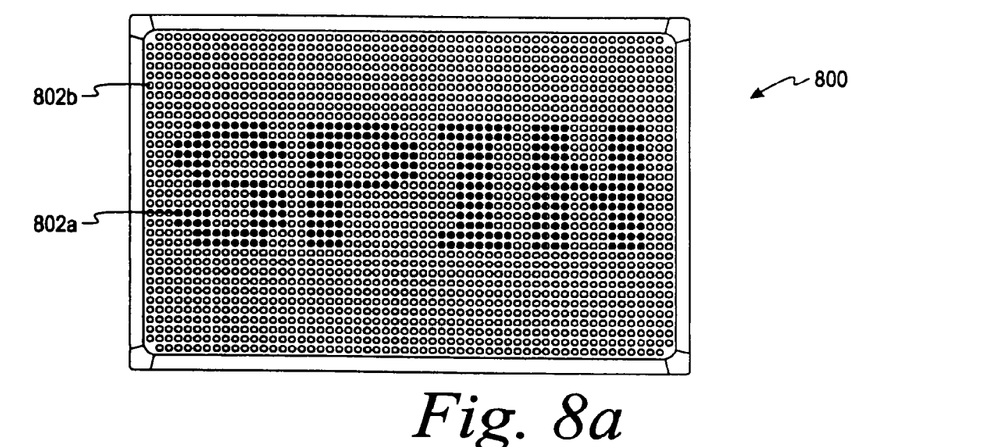
FIG. 8a is a schematic representation of an illuminated button indicating a "SPIN" function during a gaming session, according to an alternative embodiment of the present invention.
Figure 8B:
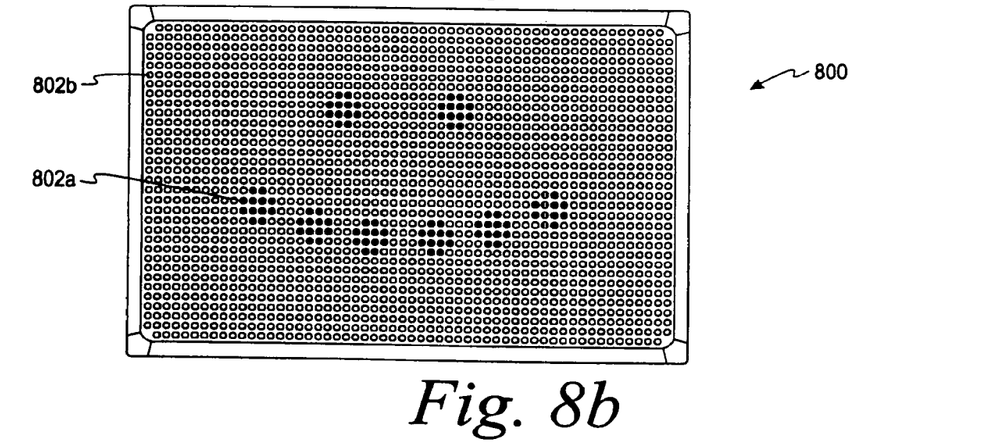
FIG. 8b shows the illuminated button of FIG. 8a indicating a "Smiley Face" image in response to the gaming machine being in a static state.
Figure 8C:
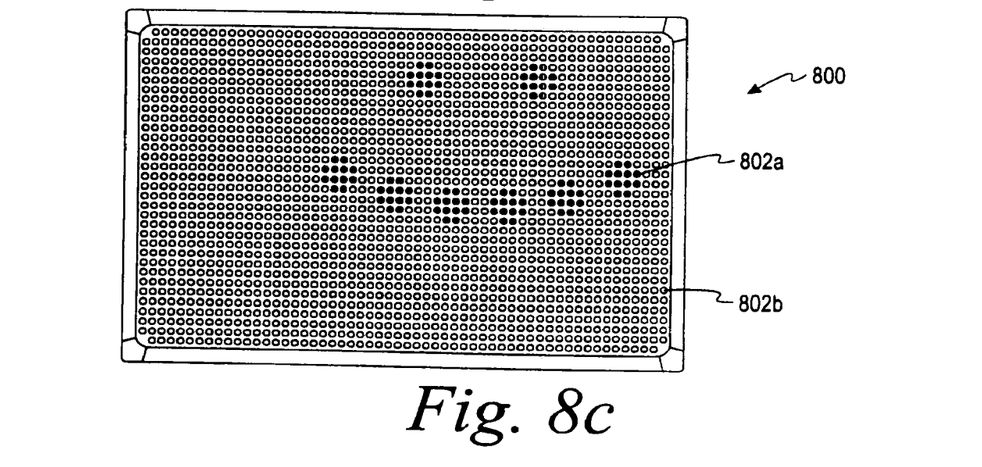
FIG. 8c shows the "Smiley Face" image of FIG. 8b in a new position on the illuminated button.

Referring to FIGS. 8a-8c, a top view representation of an illuminated button 800 shows numerous pixels that are either lit pixels 802a or off pixels 802b. The lit pixels 802a are in a "lit" state and the off pixels 802b are in an "off" state. To extend the display life of the illuminated button 800, various display animations or sequences are displayed when the gaming device to which the illuminated button 800 is coupled is in a static state. The animations or sequences would preferably have a minimum number of lit pixels to extend the life of the display. The illuminated button 800 can be used in any button on the button panel of the player input device 24 described above in reference to FIGS. 1-5b.

FIG. 8a shows a function associated with the illuminated button 800. Specifically, a player is notified that he or she can "SPIN" a plurality of reels by pressing the illuminated button 800. All the pixels defining the term "SPIN" are lit pixels 802a, while all the remaining pixels are off pixels 802b. Alternatively, all the pixels defining the term "SPIN" can be off pixels 802b, while all the remaining pixels can be lit pixels 802a.

In FIG. 8b, the gaming machine is now in a static state. Accordingly, the number of lit pixels 802a has been reduced by showing an image that requires less pixels. Specifically, a "Smiley" face is now indicated on the illuminated button 800. The number of lit pixels 802a is much lower than the number of lit pixels 802a shown in FIG. 8a when the function "SPIN" is displayed on the illuminated button 800.

In FIG. 8c, the "Smiley" face is now shifted—during a subsequent time period to the time period represented in FIG. 8b—within the illuminated button 800 so that different pixels are now lit. The shifting of the "Smiley Face" image allows for the pixels to be mostly in the "off" state so that the same pixels are not in constant use. The "Smiley Face" image can shift continuously or periodically. For example, the "Smiley Face" image can be an animation that moves continuously or can include a plurality of "Smiley Face" image snapshots that appear in various places of the illuminated button 800 at different times. Alternatively, according to other techniques, an image displayed on the illuminated button 800 can be rotated anywhere on the display.

In an alternative embodiment of the present invention, the illuminated button 800 displays an image to indicate that it has been actuated (i.e., pressed by the player). For example, before the player presses the illuminated button 800 the "SPIN" function is indicated as shown in FIG. 8a. After the player presses the illuminated button 800, the "Smiley Face" image that is shown in FIG. 8b appears to indicate that the illuminated button 800 has been pressed. Alternatively, instead of a new image the illuminated button 800 can display a darker or an offset image to indicate that the illuminated button 800 has been pressed.

According to another example, the gaming machine includes one or more illuminated buttons 800 that dynamically display functions of the wagering game. For example, the buttons 800 can display to the player the appropriate line count, a "Bet per Line" option," a "Max Bet" option, or a "Repeat Bet" option. The functions associated with each of the illuminated buttons 800 can change when a multi-game wagering session occurs or when new games are downloaded and become active. Thus, the illuminated buttons 800 can be reprogrammed to activate other functions of the same game or new functions of a new game.

During regular play, the illuminated buttons 800 initially display a graphical image, such as text, that identifies the associated function. For example, the "Repeat Bet" button 800 displays the text "Repeat Bet." When the respective function is activated or when a bonus game or bonus feature occurs, the graphical image displayed by the respective button 800 changes. For example, when the player spins the reels the text "Repeat Bet" displayed by the respective button 800 changes to display an animation that shows the text "Spinning" and three spinning reels. In another example, when the player plays a bonus game or a bonus feature, the "Repeat Bet" button 800 displays the specific bonus game or bonus feature.

The illuminated buttons 800 can be configured to display an animation that cycles based on a configurable time period. For example, all the illuminated buttons 800 are configured to cycle through three different animations every two minutes. A first animation, for example, can be a "WMS" logo that moves across one or more of the buttons 800 from left to right in a staggered fashion, to simulate a wave appearance across the button panel. After two minutes, the animation changes to a second animation, which is an animation sequence that first shows the text "Welcome," then the text "Welcome to," then the text "Welcome to G2E," and then the text "Welcome to G2E 2006." Thus, the full text message is not displayed until the last step of the animation sequence. After two minutes, the second animation changes to a third animation, which is a scrolling animation that displays the text "WAGE-NET" across one or more of the buttons 800. The scrolling animation is staggered from right to left to simulate a wave appearance across the button panel.

Alternatively, if using a multi-color display, the life of the display can be extended by cycling the color of the displayed image. The multi-color display uses two or more light-emitting elements per pixel such that each light-emitting element produces a different color. Each of the light-emitting elements can be placed in a "lit" state, an "off" state, or adjusted to a desire level of optical output as discussed above in reference to FIGS. 6a-8c. For example, the term "SPIN" depicted in FIG. 8a can be cycled by initially displaying it in a blue color during a first time period, changing it to a green color during a second time period, and, changing it to a yellow color during a third time period.

The cycling of colors can be gradual, sudden, continuous, or intermittent. Because some colors may be known to degrade at a faster or slower rate than other colors, the controller 34 can be programmed to cycle colors in a manner that decreases the usage of the color or colors that degrade most quickly. For example, the controller 34 can be programmed to cycle the colors such that the period of time that each color is used is inversely proportional to the anticipated life expectancy of that particular color.

In alternative embodiments, the controller 34 can be programmed to provide burn-in compensation for any of the displays described above. For example, according to one method the controller 34 tracks the accumulated usage of at least some of the light-emitting elements. The controller 34 can track each light-emitting element individually, or it can use a sample of the light-emitting elements to compensate zones or regions of the display. The controller 34 models, or calculates, degradation of the light-emitting elements based on a predetermined degradation data, which can be represented using a formula or a table. Based on the calculated degradation, the controller 34 increases the optical output of the more degraded light-emitting elements and/or decreases the optical output of the less degraded light-emitting elements. The increase and/or decrease of the optical output helps in achieving better uniformity over the entire display.

If the controller 34 tracks a sample of the light-emitting elements, the sample of the light-emitting elements can be uniformly distributed on the display. Alternatively, the locations of the sample light-emitting elements can be concentrated in one or more areas that are expected to receive a higher use, e.g., in the center of the display.

In alternative embodiments, the buttons of the present invention (e.g., buttons 800) can be associated with various audio output. For example, the buttons can be associated with music, audio clips, etc. Optionally, the buttons can display information (including animations) corresponding to a particular sound. For example, an animation of a person holding a trophy can be displayed generally simultaneously with sounds of applause. In another example, actions on the display modify a sound used at a specific button (e.g., a swinging sword produces a metallic sound when it hits a metal surface and a wooden sound when it hits a wooden surface).

In other embodiments, the sounds associated with a respective button are dependent on the amount of pressure, rate, and/or speed being applied to the button. For example, when pressing a button to accelerate a car the sound will be a slight murmur if the button receives a slight push and a loud screeching sound if the button receives a hard push.

The sound associated with a respective button can also provide audio feedback between a correct decision and a wrong decision. For example, pressing a correct button will play an applause sound, while pressing a wrong button will play a booing sound.

Optionally, pressing buttons in different sequences or pressing multiple buttons simultaneously can cause them to play different sounds. For example, pressing button A first and button B second will cause a soft sound, pressing button B first and button A second will cause a louder sound, and pressing button A and B simultaneously will cause an extremely loud sound.

A button state can define the sound it plays. For example, if a button is in a green-lit mode the button will cause a positive click-sound when pressed. However, if the button is in a red-lit mode the button will cause a negative click-sound when pressed.

When outputting audio information, the buttons can optionally use dedicated sound output devices. For example, each one of a plurality of buttons can include its own speaker for outputting specific sounds. Accordingly, each button can output sounds associated with corresponding functions of the button. For example, a player is required to press button A to swing a sword and button B to fire a gun. When the player presses button A, a slashing metal sound is emitted from its respective speaker. Similarly, when the player presses button B, a gunshot sound is emitted from its respective speaker. Optionally, the sounds are outputted generally simultaneously with respective video images of a swinging sword and a firing gun. In alternative embodiments, a button can include more than one speaker.

In yet other alternative embodiments, buttons can make sounds to attract the player's attention. For example, a button can repeatedly ask the player to "Press Me, If You Want To Win."

Each of these embodiments and obvious variations thereof is contemplated as falling within the spirit and scope of the claimed invention, which is set forth in the following claims.

What is claimed is:

1. A user-input button operably connected to a gaming device, the button comprising:
   a movable member configured to activate a function of the gaming device;
   a variable display device including a plurality of pixels displaying one or more images to a player by emitting light through the movable member, the one or more images associated with at least one of the function of the user-input button and a state of the gaming device; and
   a controller coupled to the variable display device and programmed to:
   track accumulated display times of the pixels of the plurality;
   calculate optical output degradation of the pixels due to the accumulated display times in accordance with predetermined degradation data;
   based on the calculated degradation, compensate for the degradation by at least one of
   (a) increasing optical output of at least some of the pixels of the plurality that have high calculated degradation, and
   (b) decreasing optical output of at least some of the pixels of the plurality that have low calculated degradation.

2. The user-input button of claim 1, wherein the controller compensates for the degradation by both increasing and decreasing the optical output of the respective pixels in accordance with the calculated degradation of the respective pixels.

3. The user-input button of claim 1, wherein each pixel of the plurality of pixels operates at a plurality of optical output levels in addition to a standard lit state and a standard off state.

4. The user-input button of claim 3, wherein to increase the optical output comprises operating the highly degraded pixels at a higher optical output level than a standard lit state, and to decrease the optical output comprises operating the less degraded pixels at an optical output level that is lower than the standard lit state and higher than a standard off state.

5. The user-input button of claim 4, wherein the increased and decreased optical output levels correspond to the calculated degradation of the respective pixels of the plurality.

6. The user-input button of claim 1, wherein the increased optical output causes the highly degraded pixels to emit more light, and the decreased optical output causes the less degraded pixels to emit less light, such that the overall optical output of the variable display device appears uniform.

7. The user-input button of claim 1, wherein the controller, while compensating for the degradation, is further programmed to display an animated sequence on the variable display device, the animated sequence including alternating between a first set of illuminated pixels and at least a second set of illuminate pixels.

8. The user-input button of claim 1, wherein the controller, while compensating for the degradation, is further programmed to simulate movement of the one or more images on the variable display device such that different pixels of the plurality of pixels display a same portion of the one or more images at different times.

9. The user-input button of claim 1, wherein the variable display device is selected from a group consisting of an organic-light-emitting-diode display device and a plasma display device.

10. The user-input button of claim 1, wherein the state of the gaming device is a game being played on the gaming machine, and wherein the one or more images are associated with the game being played on the gaming device.

11. A computer-implemented method of extending life of a user-input button of a gaming machine, the user-input button having movable member, a variable display device including a plurality of pixels, and one or more processors coupled to the display device, the method comprising:
  displaying, via the variable display device, one or more images by causing one or more pixels of the plurality of pixels to emit light through the movable member, the one or more images associated with at least one of a function of the user-button and a state of a gaming device;
  tracking, via the one or more processors, accumulated display times of the pixels of the plurality of pixels,
  calculating, via the one or more processors, optical output degradation of the pixels due to the accumulated display times in accordance with predetermined degradation data;
  based on the calculated degradation, compensating for the degradation by at least one of
    (a) increasing optical output of at least some of the pixels of the plurality that have high calculated degradation, and
    (b) decreasing optical output of at least some of the pixels of the plurality that have low calculated degradation.

12. The method of claim 11, wherein compensating for the degradation includes both increasing and decreasing the optical output of the respective pixels in accordance with the calculated degradation of the respective pixels.

13. The method of claim 11, wherein each pixel of the plurality of pixels operates at a plurality of optical output levels in addition to a standard lit state and a standard off state.

14. The method of claim 13, wherein increasing the optical output comprises operating the highly degraded pixels at a higher optical output level than a standard lit state, and decreasing the optical output comprises operating the less degraded pixels at an optical output level that is lower than the standard lit state and higher than a standard off state.

15. The method of claim 14, wherein the increased and decreased optical output levels correspond to the calculated degradation of the respective pixels of the plurality.

16. The method of claim 11, wherein the increased optical output causes the highly degraded pixels to emit more light, and the decreased optical output causes the less degraded pixels to emit less light, such that the overall optical output of the variable display device appears uniform.

17. The method of claim 11, wherein the one or more processors, while compensating for the degradation, simulate movement of the one or more images on the variable display such that different pixels of the plurality of pixels display a same portion of the one or more images at different times.

18. The method of claim 11, wherein the variable display device is selected from a group consisting of an organic-light-emitting-diode display device and a plasma display device.

19. The method of claim 11, wherein the state of the gaming machine is a game being played on the gaming machine, and wherein the one or more images are associated with the game being played on the gaming machine.

20. A computer-readable, non-transitory medium including instructions that, when executed by a gaming machine including a user-input button having movable member, a variable display device including a plurality of pixels, and a controller coupled to the display device, cause the gaming machine to perform the method comprising:
  displaying, via the variable display device, one or more images by causing one or more pixels of the plurality of pixels to emit light through the movable member, the one or more images associated with at least one of a function of the user-button and a state of the gaming machine;
  tracking, via the controller, accumulated display times of the pixels of the plurality of pixels,
  calculating, via one or more processors, optical output degradation of the pixels due to the accumulated display times in accordance with predetermined degradation data;
  based on the calculated degradation, compensating for the degradation by at least one of
    (a) increasing optical output of at least some of the pixels of the plurality that have high calculated degradation, and
    (b) decreasing optical output of at least some of the pixels of the plurality that have low calculated degradation.

21. The medium of claim 20, wherein compensating for the degradation includes both increasing and decreasing the optical output of the respective pixels in accordance with the calculated degradation of the respective pixels.

22. The medium of claim 20, wherein each pixel of the plurality of pixels can operate at a plurality of optical output levels in addition to a standard lit state and a standard off state.

23. The medium of claim 22, wherein increasing the optical output comprises operating the highly degraded pixels at a higher optical output level than a standard lit state, and decreasing the optical output comprises operating the less degraded pixels at an optical output level that is lower than the standard lit state and higher than a standard off state.

24. The medium of claim 23, wherein the increased and decreased optical output levels correspond to the calculated degradation of the respective pixels of the plurality.

25. The medium of claim 20, wherein the increased optical output causes the highly degraded pixels to emit more light, and the decreased optical output causes the less degraded pixels to emit less light, such that the overall optical output of the variable display device appears uniform.

26. The medium of claim 20, wherein the state of the gaming machine is a game being played on the gaming machine, and wherein the one or more images are associated with the game being played on the gaming machine.

* * * * *